United States Patent
Lee

(10) Patent No.: US 8,483,545 B2
(45) Date of Patent: Jul. 9, 2013

(54) METHOD AND APPARATUS FOR REPRODUCING MOTION PICTURE FILES

(75) Inventor: Min-Ji Lee, Suwon-si (KR)

(73) Assignee: Samsung Electronics Co., Ltd (KR)

( * ) Notice: Subject to any disclaimer, the term of this patent is extended or adjusted under 35 U.S.C. 154(b) by 1145 days.

(21) Appl. No.: 11/932,414

(22) Filed: Oct. 31, 2007

(65) Prior Publication Data

US 2008/0101769 A1    May 1, 2008

(30) Foreign Application Priority Data

Oct. 31, 2006 (KR) .................. 10-2006-0106399

(51) Int. Cl.
   *H04N 9/80*    (2006.01)
(52) U.S. Cl.
   USPC ........................................................ 386/241
(58) Field of Classification Search
   USPC ........................................................ 386/241
   See application file for complete search history.

(56) References Cited

U.S. PATENT DOCUMENTS

| | | | |
|---|---|---|---|
| 2003/0077066 A1* | 4/2003 | Greenwood et al. | 386/52 |
| 2004/0268398 A1* | 12/2004 | Fano et al. | 725/88 |
| 2006/0183506 A1* | 8/2006 | Park et al. | 455/566 |
| 2007/0014404 A1* | 1/2007 | Cha | 380/201 |
| 2008/0124056 A1* | 5/2008 | Concotelli | 386/124 |

FOREIGN PATENT DOCUMENTS

| | | |
|---|---|---|
| EP | 0 801 391 | 10/1997 |
| EP | 0 920 014 | 6/1999 |
| EP | 1 041 565 | 10/2000 |
| EP | 1 453 284 | 9/2004 |
| KR | 1020040073654 | 8/2004 |
| KR | 1020040083234 | 10/2004 |
| KR | 1020050002681 | 1/2005 |
| WO | WO 02/087249 | 10/2002 |

OTHER PUBLICATIONS

Design and Evaluation of mProducer—A Mobile Authoring Tool for Personal Experience Computing, Chao-Ming Teng 2004.*
A Semi-automatic Approach to Home Video Editing, Giegensohn, May 11, 2000.*
A Method for Setting a Standby Screen of a Cellular Phone, Cho, 2003.*
Cho: Method for Setting Standby Screen of Cellular Phone, Nov. 1, 2003.
Girgensohn et al.: A Semi-Automatic Approach to Home Video Editing, Nov. 5, 2000.
Teng et al.: Design and Evaluation of mProducer: A Mobile Authoring Tool for Personal Experience Computing, Oct. 27, 2004.

* cited by examiner

*Primary Examiner* — Thai Tran
*Assistant Examiner* — William Tran
(74) *Attorney, Agent, or Firm* — The Farrell Law Firm, P.C.

(57) ABSTRACT

A reproduction method is disclosed that creates an index file including start point and termination point information connected with user designated specified section of a motion picture file (MPF), and MPF storage location. According to index file selection and related reproduction request, the specified section of the corresponding MPF is reproduced with reference to above information stored in the index file, allowing convenient viewing of the specified section of the MPF.

20 Claims, 4 Drawing Sheets

METHOD AND APPARATUS FOR REPRODUCING MOTION PICTURE FILES

PRIORITY

This application claims priority under 35 U.S.C. §119(a) to an application entitled "METHOD AND APPARATUS FOR REPRODUCING MOVING PICTURE FILES" filed in the Korean Industrial Property Office on Oct. 31, 2006 and assigned Serial No. 2006-106399, the contents of which are incorporated herein by reference.

BACKGROUND OF THE INVENTION

1. Field of the Invention

The present invention relates to motion picture files, and more particularly to a method and apparatus for reproducing motion picture files.

2. Description of the Related Art

Generally, a reproducing apparatus for motion picture file reproduces a motion picture file from its beginning according to a reproduction request for the motion picture file. When a user then wants to reproduce a motion picture file from a specified section thereof other than from its beginning, the user's reproduction request must search for a start point of the specified section using a fast forward and a fast rewind, which are seek functions, or otherwise through selecting a point that is guessed to be a start point using a scroll bar that indicates a reproduction point of a motion picture file. When seeking for a specified section in a motion picture file, a user can hardly find the precise point at one time, so that there is inconvenience in that a seeking operation has to be repeated several times. Furthermore, although the specified section of the motion picture file that a user wants to reproduce is a section that had been previously reproduced through searching, reproduction information on the specified section is not particularly stored so that the user has no choice but to inconveniently and repeatedly take an action that is related to the search of a start point.

Due to such problems, there has been developed a function in which only a specified section of a motion picture file is separately recorded using a separate editing function of a motion picture file to thereby create and store a new motion picture file. However, in this case, since memory usage is increased as the new motion picture file is created, particularly for a portable reproducing apparatus that has a small available memory capacity, excess memory space is required. In addition, since such a portable reproducing apparatus in general has other functions, such as mobile communication, than a reproducing function of a motion picture file, it needs a method capable of reproducing a motion picture file in association with the other functions, without simply reproducing the motion picture file.

On the other hand, a reproducing apparatus of a motion picture file provides, as a preview image, a certain frame included in the motion picture file, in addition to a file name of the motion picture file, as guide information regarding the stored motion picture file. However, since the image of the first frame of the motion picture file is generally provided as the preview image, a user has to inconveniently and directly reproduce the motion picture file in order to find, in the motion picture file, the contents that the user wants to reproduce. Accordingly, there is a need to provide a method capable of setting a desired frame as preview image.

SUMMARY OF THE INVENTION

As described above, when a user wants to reproduce a specified section of a motion picture file, there is a need to provide a method of easily and conveniently reproducing a motion picture file to efficiently utilize of a memory capacity of a portable reproducing apparatus for a motion picture file.

Accordingly, the present invention has been made to solve the above-mentioned problems occurring in conventional systems, and an aspect of the present invention is to provide a method and apparatus for reproducing a motion picture file by which a specified section of the motion picture file can be easily and conveniently reproduced.

Another aspect of the present invention is to provide a method and apparatus for reproducing a motion picture file by which a memory of a reproducing apparatus for a motion picture file can be efficiently used.

A further aspect of the present invention is to provide a method and apparatus for reproducing a motion picture file by which a user is provided with information on the motion picture file.

In order to accomplish these aspects, a method is provided that includes creating and storing one or more index files according to user's request, providing a list of the index files, extracting original file path information included in the index file selected by a user from among the one or more index files, searching a corresponding motion picture file from among motion picture files, and reproducing and outputting a specified section of the motion picture file corresponding to information on a start point and the section included in the selected index file, from among the whole reproduction interval of the searched motion picture file.

BRIEF DESCRIPTION OF THE DRAWINGS

The above and other aspects, features and advantages of the present invention will be more apparent from the following detailed description taken in conjunction with the accompanying drawings, in which.

DETAILED DESCRIPTION OF THE PREFERRED EMBODIMENTS

Hereinafter, preferred embodiments of the present invention will be described with reference to the accompanying drawings. In the following description of the present invention, a detailed description of known functions and configurations incorporated herein will be omitted when it may make the subject matter of the present invention rather unclear.

Figure 1:
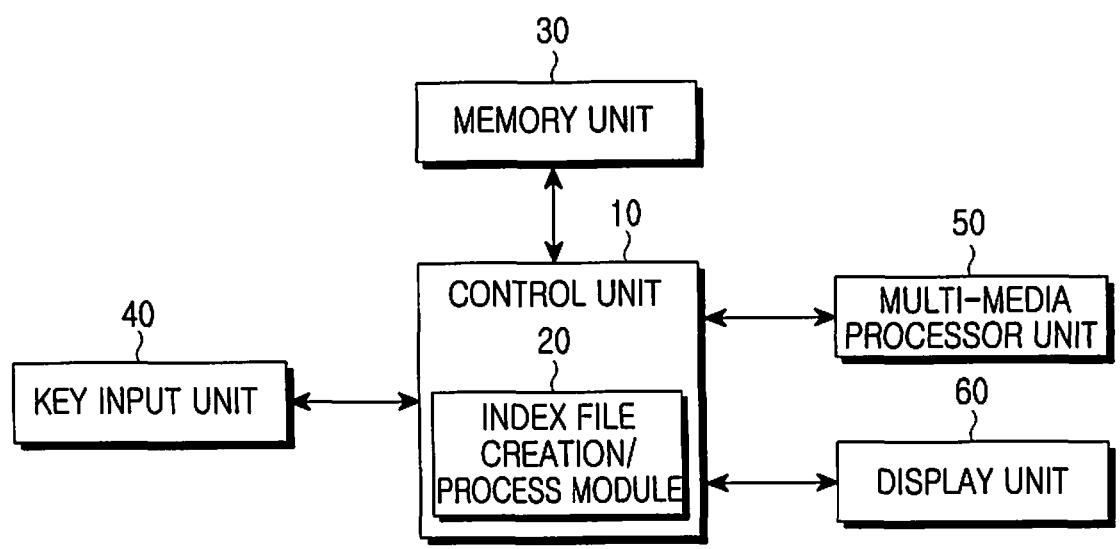
FIG. 1 is a block diagram of a reproduction apparatus for a motion picture file, to which the present invention is adapted.

FIG. 1 is a block diagram of a reproduction apparatus for a motion picture file, to which the present invention is adapted. The reproduction apparatus for a motion picture file is one for reproducing and creating a motion picture file. Those of skill in the art will recognize that the reproduction apparatus of the invention can be provided with diverse functions such as a wireless communication function, a broadcasting receiving function, or others, in addition to a function related to a motion picture file. Referring to FIG. 1, the reproduction apparatus includes a control unit 10, a memory unit 30, a key input unit 40, a multi-media processor unit 50, and a display unit 60.

The key input unit 40 has various function keys for menu, selection, reproduction, stop, fast winding, fast rewinding, pause, erasing, power/turning-off, volume, etc. that conform with various functions of a conventional reproduction apparatus, to thereby provide the control unit 10 with key input data that correspond to keys a user presses.

The multi-media processor unit 50 performs, upon reproduction of a motion picture file, an image process and a sound process to the motion picture file stored in the memory unit 30, that is output via the display unit 60 and a speaker (not shown), under the control of the control unit 10. The processor unit 50 also stores the motion picture file in the memory unit 30 through recording, and so on. The display unit 60 displays various image information, and displays on a screen thereof images outputted from the multi-media processor unit 50.

The memory unit 30 stores therein programs of the control unit 10 for process and control, reference data, various updatable data for storage and so on, and is provided as a working memory of the control unit 10 and the multi-media processor unit 50. The memory unit also stores many motion picture files, and stores many index files according to an embodiment of the invention.

The control unit 10 controls the general operation of the reproduction apparatus for a motion picture file, and includes an index file creation/process module 20 according to an embodiment of the invention. The index file creation/process module 20 creates index files, stores them in the memory unit 30, and processes the index files stored in the memory unit 30 to control the multi-media processor unit 50 to reproduce the corresponding motion picture file.

Figure 4:
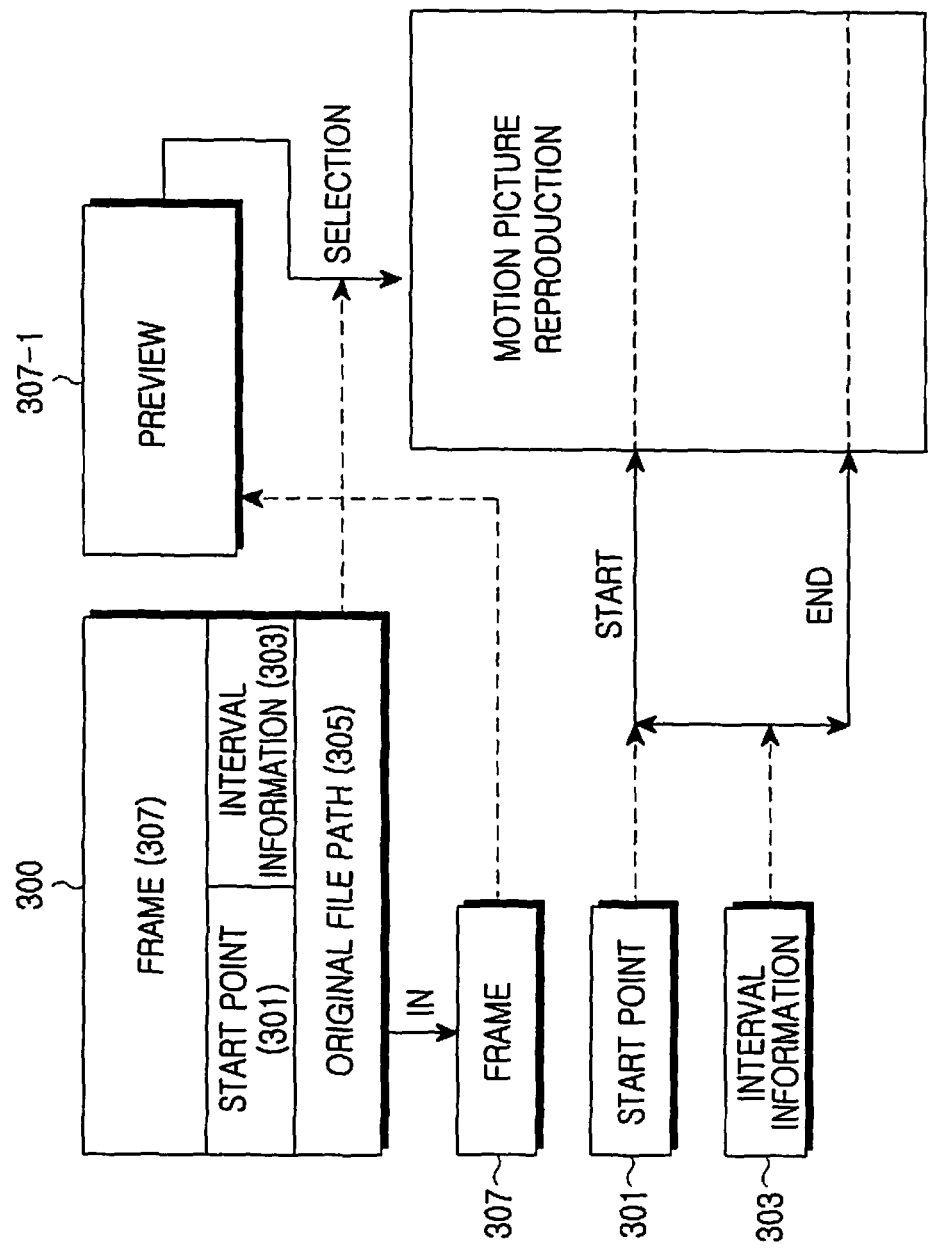
FIG. 4 illustrates a relation between the configuration of the index file and the motion picture file upon reproduction according to an embodiment of the invention.

The index files store information required to reproduce a specified section of certain motion picture file designated by a user according to an embodiment of the invention, and include information on a start time, a reproduction interval, an original file path, and a preview-related frame. The configuration of the index file is illustrated in FIG. 4. FIG. 4 illustrates a relation between the configuration of the index file and the motion picture file upon reproduction according to an embodiment of the invention. In FIG. 4, a first index file 300, as an exemplary file according to the invention, includes a frame 307, a start time 301, interval information 303, and an original file path 305. The frame 307 is preview information on the specified section of the corresponding motion picture file to the first index file 300, and is composed of frame images corresponding to the user's section among the frames included in the specified section of the corresponding motion picture file to the first index file 300. For example, a first frame image of the specified section of the motion picture file can be set as a default, and a frame image selected by a user can be set as an option.

The start time 301 provides information on a point when a specified section designated by a user starts in the corresponding motion picture file to the first index file 300. The interval information 303 is information on a point when the specified section designated by the user terminates in the corresponding motion picture file to the first index file 300. The original file path 305 provides information on a location where the motion picture file, including the specified section, is stored. If the storage location of the corresponding motion picture file is changed after the index file is created, the index file creation/process module 20 of the control unit 10 automatically updates the changed storage location.

Figure 2:
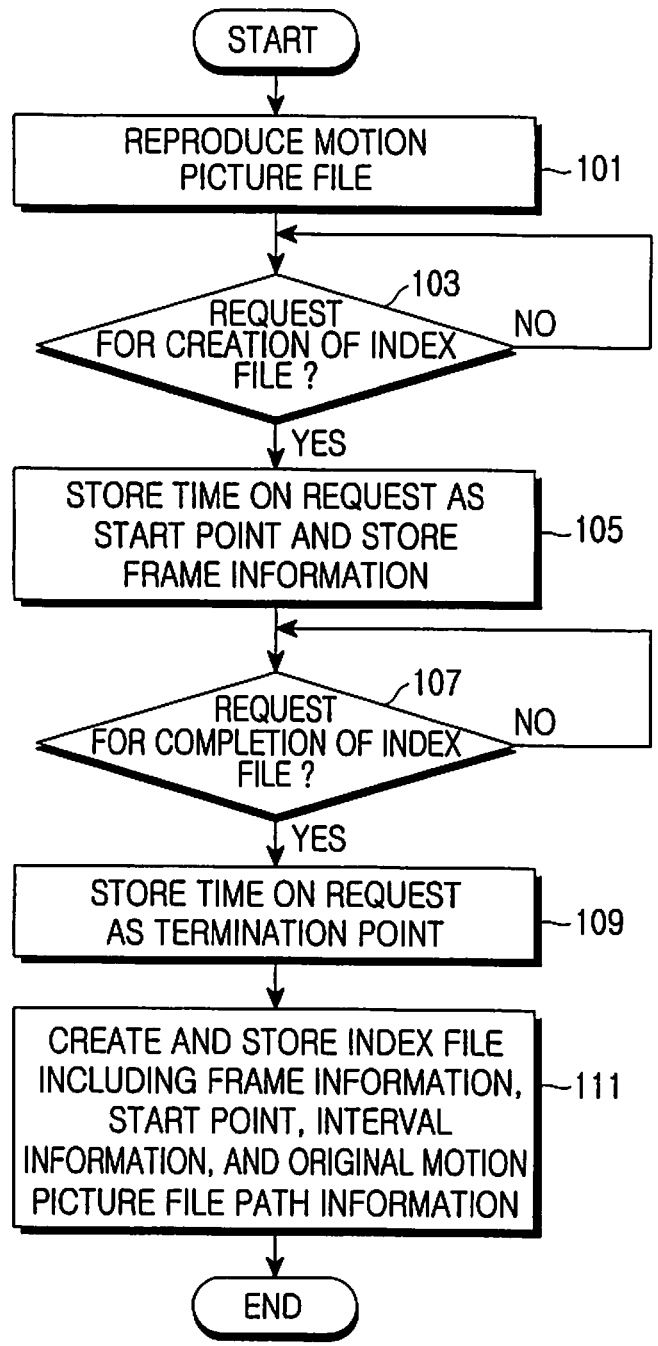
FIG. 2 is a flowchart illustrating a procedure of creating an index file according to an embodiment of the invention.

A description is now provided of a procedure of creating an index file in the reproduction apparatus as constructed above according to an embodiment of the invention, with reference to FIG. 2. FIG. 2 is a flowchart of a procedure of creating an index file according to an embodiment of the invention. Referring to FIG. 2, the control unit 10 of the reproduction apparatus controls, in step 101, the multi-media processor unit 50 to reproduce a motion picture file selected corresponding to a user's request. Then, in step 103, when a user requests creation of an index file, the index file creation/process module 20 of the control unit 10 stores, in step 105, a point when the request is made as a reproduction start time of a specified section designated by a user in a whole reproduction interval of the motion picture file currently reproduced, and stores as frame information a frame image corresponding to the start time.

Then, in step 107, when a request for file completion is inputted by the user, the index file creation/process module 20 proceeds to step 109 to store a point when the request is made as a reproduction termination time of the specified section designated by the user in the whole reproduction interval of the motion picture file currently reproduced, and proceeds to step 111. That is, when a user wants to reproduce only a portion of the motion picture file again after a time, when the user inputs a request for creation of an index file and a request for completion of the index file at the start point and the termination point, respectively, of the corresponding section, appreciating the motion picture file currently reproduced, the index file creation/process module 20 detects the requests and stores the points when the respective requests are made in connection with the motion picture file currently reproduced. In step 111, the index file creation/process module 20 sets the frame 307 as frame information, the start time 301 as the reproduction start time, the interval information 303 as the reproduction termination time, and the original file path 305 as the storage location of the motion picture file currently reproduced, to thereby create and store an index file. Since such an index file is created corresponding to a specified section of a certain motion picture file designated by a user, many index files related to one motion picture file can be created.

While the above embodiment has illustrated the case where a frame image corresponding to the start point is set as a frame, it may be constructed such that a user can select a certain frame among many frames included in the specified section. In addition, in the selection method of the termination point, the termination point may be designated to a point after a predetermined time interval from when a request for creation of an index file is inputted, i.e., a point after a predetermined time interval from the start point, in addition to a point designated by a direct input of a user's request for completion of an index file. For example, the termination point may be set to a point after 10 seconds or one minute from the start point, and the time interval may be previously set by a user.

Figure 3:
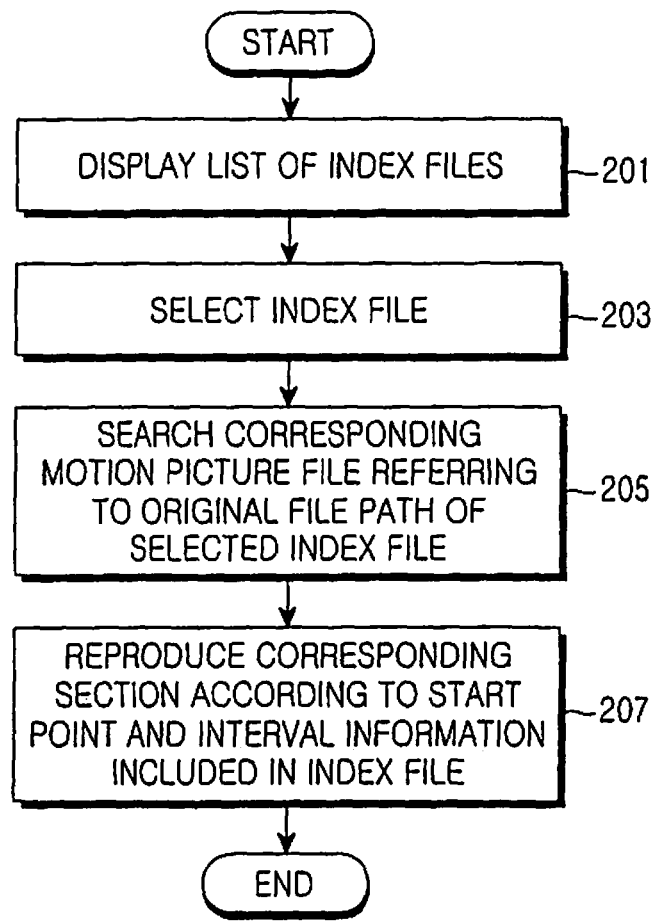
FIG. 3 is a flowchart illustrating a procedure in which the reproduction apparatus reproduces a motion picture file using the index file according to an embodiment of the invention.

A description is now made of a procedure of reproducing a motion picture file using an index file created as above, with reference to FIGS. 3 and 4. FIG. 3 is a flowchart illustrating a procedure in which the reproduction apparatus reproduces a motion picture file using the index file according to an embodiment of the invention. Referring to FIG. 3, the index file creation/process module 20 of the control unit 10 displays, in step 201, a list of the index files according to a user's request. Herein, the index file creation/process module 20 can provide a frame image stored in the frame of the respective index files in preview information of the respective index files. That is, the index file list is configured into a frame image stored in the frame of the respective index files, and is displayed. For example, the first index file 300 in FIG. 4, a frame image stored in the frame 307 can be provided in preview 307-1. Thus, a user can intuitively grasp motion picture files related to the respective index files, and a specified section to be reproduced upon selection of the corresponding index file. Then, in step 203, when a user selects a certain index file and makes a request for reproduction, the index file creation/process module 20 searches, in step 205, the corresponding motion picture file with reference to the original file path of the selected index file, and proceeds to step 207. For example, when the first index file is selected and a reproduction request related is input, the index file creation/process module 20 searches the corresponding motion picture file with reference to the original file path 305 included in the first index file 300. When the search for the corresponding motion picture file is completed in step 205, the index file creation/process module 20 reproduces and outputs the corresponding motion picture to a specified section of the motion picture searched according to the start time and the interval information included in the index file. That is, the module detects the start time 301 and the interval information 303 in the first index file 300, and reproduces the corresponding motion picture to the specified section that corresponds to above two time information.

In this way, in the present invention, the reproduction apparatus for a motion picture file creates the index file that includes the start point information and the termination point information in connection with the specified section of the motion picture file designated by a user, and the storage location of the motion picture file, and, according to the selection of the index file and the related reproduction request, reproduces the specified section of the corresponding motion picture file with reference to above information stored in the index file, thereby allowing a user to conveniently watch the specified section of the motion picture file. Although the reproduction apparatus creates and stores a simple index file that includes the start point information and the termination point information in connection with the specified section of the motion picture file designated by a user, and the storage location of the motion picture file, the reproduction apparatus has the effect of storing the motion picture file corresponding to the specified section, and efficiently utilizing the memory as well. Moreover, a frame image that a user wants to display is set to be a preview function related to a specified section of a certain motion picture file, so that it is possible to further intensify information transmission of the preview function.

Such an index file may be set to be executed in association with other functions provided in the reproduction apparatus for a motion picture file. For example, when the reproduction apparatus is provided with a communication function, when a certain index file is set in a manner of call-incoming or message-receiving notification, upon call-incoming or message-receiving, the index file creation/process module 20 may be so configured as to reproduce a related motion picture file referring to information stored in the certain index file. In addition, when the reproduction apparatus is provided with an alarm function, the index file may be set to provide an alarm. Further, it may be configured such that a certain index file is set to be a standby screen of the reproduction apparatus, so that when the reproduction apparatus is switched from an idle state into a standby state by key input and so on, a motion picture file related to the certain index file set is reproduced.

While the invention has been shown and described with reference to certain preferred embodiments thereof, it will be understood by those skilled in the art that various changes in form and details may be made therein without departing from the spirit and scope of the invention as defined by the appended claims.

As set forth before, in the present invention, the reproduction apparatus for a motion picture file creates the index file that includes the start point information and the termination point information in connection with the specified section of the motion picture file designated by a user, and the storage location of the motion picture file, and according to the selection of the index file and the reproduction request related, reproduces the specified section of the corresponding motion picture file with reference to above information stored in the index file, thereby allowing a user to conveniently watch the specified section of the motion picture file.

What is claimed is:

1. A method of reproducing motion picture files stored in a reproduction apparatus for a motion picture file, the method comprising the steps of:

detecting original file path information included in an index file selected by a user from among one or more previously stored index files, and searching a corresponding motion picture file from among a plurality of motion picture files, wherein the original file path information includes a storage location where the corresponding motion picture file is stored;

reproducing and outputting a specified section corresponding to start point information and interval information included in the selected index file in a whole reproduction interval of the searched motion picture file: and when the storage location of the corresponding motion picture file is changed, automatically updating the original file path information with the changed storage location, wherein the start point information includes information on a point when a specified section designated by the user starts in the corresponding motion picture file, and the interval information includes information on a point when a specified section designated by the user terminates in the corresponding motion picture file, and wherein the selected index file further includes preview information on the specified section of the whole reproduction interval of the searched motion picture file.

2. The method according to claim 1, further comprising, upon providing a list of one or more index files, providing, as preview information, an image corresponding to frame image information included in respective index files.

3. The method according to claim 1, further comprising:

setting a certain index file from among one or more index files in a manner of call-incoming notification in response to user's selection; and upon an incoming call, detecting the original file path information included in the certain index file, searching a corresponding motion picture file among the plurality of motion picture files, and reproducing and outputting the specified section corresponding to start point information and interval information included in the selected index file in a whole reproduction interval of the searched motion picture file.

4. The method according to claim 1, further comprising:

setting a certain index file from among one or more index files in a manner of message-receiving notification in response to user's selection; and upon message-receiving, detecting the original file path information included in the certain index file, searching a corresponding motion picture file among the plurality of motion picture files, and reproducing and outputting the specified section corresponding to start point information and interval information included in the selected index file in a whole reproduction interval of the searched motion picture file.

5. The method according to claim 1, further comprising:
setting a certain index file from among one or more index files with an alarm sound in response to a user's selection; and
upon reaching a predetermined alarm generation time, detecting the original file path information included in the certain index file, searching a corresponding motion picture file among the plurality of motion picture files, and reproducing and outputting the specified section corresponding to start point information and interval information included in the selected index file in a whole reproduction interval of the searched motion picture file.

6. The method according to claim 1, further comprising:
setting a certain index file from among one or more index files as a standby screen of the reproduction apparatus for a motion picture file in response to a user's selection; and
when the reproduction apparatus is switched into a standby mode in response to user's input, detecting the original file path information included in the certain index file, searching a corresponding motion picture file among the plurality of motion picture files, and reproducing and outputting the specified section corresponding to start point information and interval information included in the selected index file in a whole reproduction interval of the searched motion picture file.

7. A method of reproducing motion picture files stored in a reproduction apparatus for a motion picture file, the method comprising the steps of:
creating and storing one or more index files according to a user's request;
providing a list of one or more index files;
detecting original file path information included in a certain index file selected by a user from among one or more index files, and searching a corresponding motion picture file from among a plurality of motion picture files, wherein the original file path information includes a storage location where the corresponding motion picture file is stored;
reproducing and outputting a specified section corresponding to start point information and interval information included in the selected index file in a whole reproduction interval of the searched motion picture file; and
when the storage location of the corresponding motion picture file is changed, automatically updating the original file path information with the changed storage location,
wherein the start point information includes information on a point when a specified section designated by the user starts in the corresponding motion picture file, and the interval information includes information on a point when a specified section designated by the user terminates in the corresponding motion picture file, and
wherein the selected index file further includes preview information on the specified section of the whole reproduction interval of the searched motion picture file.

8. The method according to claim 7, wherein in the step of providing the list of one or more index files, an image corresponding to a frame image included in the respective index files is provided as preview information.

9. The method according to claim 8, wherein the step of creating and storing the index file comprises:
reproducing a corresponding motion picture file to a user's selection from among the plurality of motion picture files;
when a request for creation of an index file is inputted by a user, storing, as a start point, a reproduction point of the motion picture file corresponding to a point when the request for creation of the index file is inputted;
storing a termination point; and
creating and storing the index file, including, as an original file path, a storage location of a currently reproduced motion picture file, the termination point as interval information, and the start point.

10. The method according to claim 9, wherein the step of creating and storing the index file further comprises creating, as preview information, a frame image corresponding to a frame selected by a user from among frames provided between the start point and the termination point, the frames constituting the motion picture file.

11. The method according to claim 9, wherein, in the step of storing the termination point, when a request for completion of the index file is inputted from the user, the reproduction point of the motion picture file corresponding to a point when the request for completion of the index file is input is stored as the termination point.

12. The method according to claim 9, wherein in the step of storing the termination point, a point after a predetermined time interval from the start point is stored as the termination point.

13. The method according to claim 12, wherein the predetermined time interval is set by the user.

14. The method according to claim 9, wherein the step of creating and storing the index file further comprises creating a corresponding frame image to a frame that corresponds to the start point, while including the corresponding frame as preview information.

15. An apparatus for reproducing motion picture files, the apparatus comprising:
a memory storing a plurality of motion picture files and one or more index files related to the motion picture files, created according to a user's request; and
an index file creation/process module for controlling a multi-media processor unit, such that one or more index files are created and stored according to the user's request, a list of one or more index files is provided, original file path information which includes a storage location where a corresponding motion picture file is stored and is included in a certain index file selected by the user is detected from among one or more index files, the corresponding motion picture file is searched from among the plurality of motion picture files, a specified section corresponding to start point information and interval information included in the selected index file is reproduced and outputted in a whole reproduction interval of the searched motion picture file, and when the storage location of the corresponding motion picture file is changed, the original file path information is automatically updated with the changed storage location,
wherein the start point information includes information on a point when a specified section designated by the user starts in the corresponding motion picture file, and the interval information includes information on a point when a specified section designated by the user terminates in the corresponding motion picture file, and
wherein the selected index file further includes preview information on the specified section of the whole reproduction interval of the searched motion picture file.

16. The apparatus according to claim 15, wherein upon providing the list of one or more index files, the index file creation/process module provides, as preview information, an image corresponding to a frame image included in respective index files.

17. The apparatus according to claim 16, wherein upon creation and storage of the index file, the index file creation/process module: reproduces a corresponding motion picture file to a user's selection from among the plurality of motion picture files; when a request for creation of an index file is inputted by a user, stores, as a start point, a reproduction point of the motion picture file corresponding to a point when the request for creation of the index file is inputted; stores a termination point; and creates and stores the index file, including, as an original file path, a storage location of the motion picture file currently reproduced, the termination point as interval information, and the start point.

18. The apparatus according to claim 17, wherein upon creation and storage of the index file, the index file creation/process module includes, as preview information in the index file, a frame image corresponding to a frame selected by a user among the frames provided between the start point and the termination point, the frames constituting the motion picture file.

19. The apparatus according to claim 18, wherein upon storage of the termination point, when a request for completion of the index file is inputted by the user, the index file creation/process module stores, as the termination point, the reproduction point of the motion picture file corresponding to a point when the request for completion of the index file is inputted.

20. The apparatus according to claim 18, wherein upon storage of the termination point, the index file creation/process module stores, as the termination point, a point after a predetermined time interval from the start point.

* * * * *